United States Patent
Kodama

(10) Patent No.: US 8,830,497 B2
(45) Date of Patent: Sep. 9, 2014

(54) IMAGE FORMING APPARATUS REALIZING ELECTRICITY CONSERVATION BY REDUCING POWER CONSUMPTION

(71) Applicant: Hirotaka Kodama, Osaka (JP)

(72) Inventor: Hirotaka Kodama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 109 days.

(21) Appl. No.: 13/661,438

(22) Filed: Oct. 26, 2012

(65) Prior Publication Data

US 2013/0107310 A1 May 2, 2013

(30) Foreign Application Priority Data

Oct. 27, 2011 (JP) .................................. 2011-235874

(51) Int. Cl.
*G06K 15/00* (2006.01)
*G06F 3/12* (2006.01)

(52) U.S. Cl.
USPC ........................................ 358/1.14; 358/1.15

(58) Field of Classification Search
USPC ........ 358/1.13, 1.14, 1.15; 347/192; 370/318; 396/129; 399/37; 713/300, 320, 321
See application file for complete search history.

(56) References Cited

U.S. PATENT DOCUMENTS

| | | | |
|---|---|---|---|
| 6,791,704 B1 * | 9/2004 | Moreau et al. | 358/1.15 |
| 7,886,170 B2 * | 2/2011 | Komatsu et al. | 713/323 |
| 8,027,046 B2 * | 9/2011 | Yamasaki | 358/1.14 |
| 8,126,351 B2 * | 2/2012 | Ishizuka | 399/88 |
| 8,321,702 B2 * | 11/2012 | Kaneko et al. | 713/320 |
| 2008/0188993 A1 | 8/2008 | Ikusawa | |
| 2011/0276818 A1 * | 11/2011 | Yamamoto et al. | 713/340 |

FOREIGN PATENT DOCUMENTS

| | | |
|---|---|---|
| JP | 2000-78748 A | 3/2000 |
| JP | 2002-205421 A | 7/2002 |
| JP | 2005-215316 A | 8/2005 |
| JP | 2008-192037 A | 8/2008 |
| JP | 2009-86107 A | 4/2009 |

* cited by examiner

*Primary Examiner* — Gabriel Garcia

(74) *Attorney, Agent, or Firm* — Birch, Stewart, Kolasch & Birch, LLP

(57) ABSTRACT

Image forming apparatus communicates with a server computer and obtains information related to state of power supply from the server computer. Based on the obtained information, the image forming apparatus determines whether or not it is in a time zone of peak power consumption. If it is determined to be the time zone of peak power consumption, a method of counting the number of outputs is switched to a weighted counting method, for counting with weight added to the normal counting method.

2 Claims, 14 Drawing Sheets

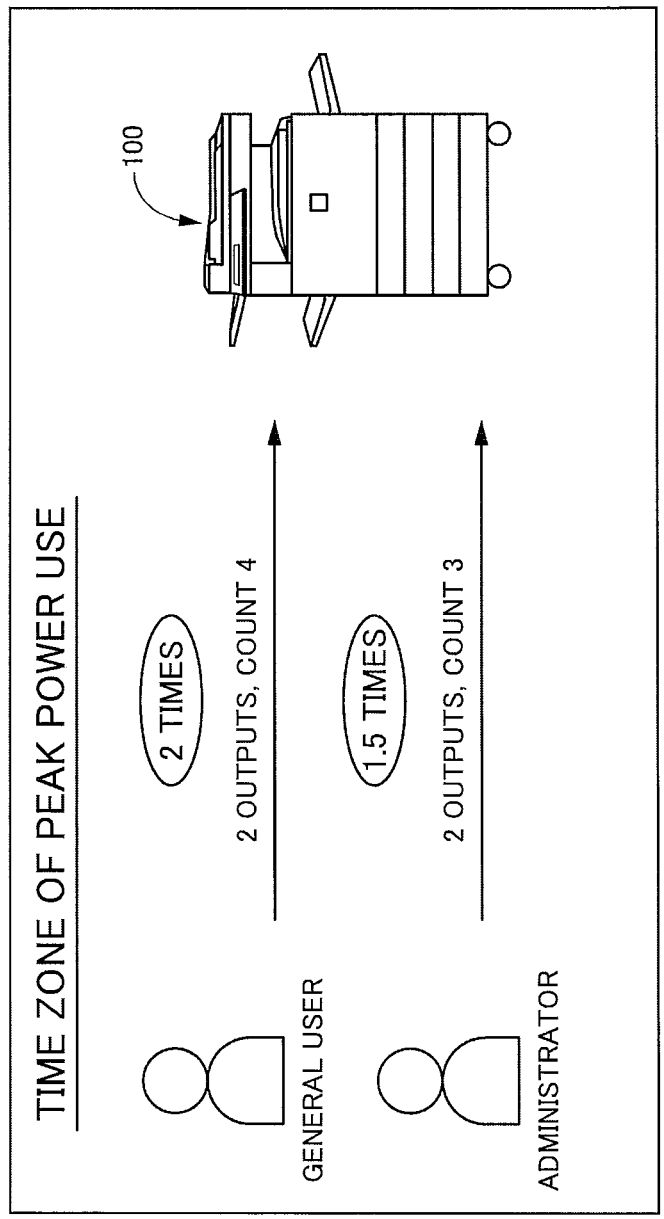

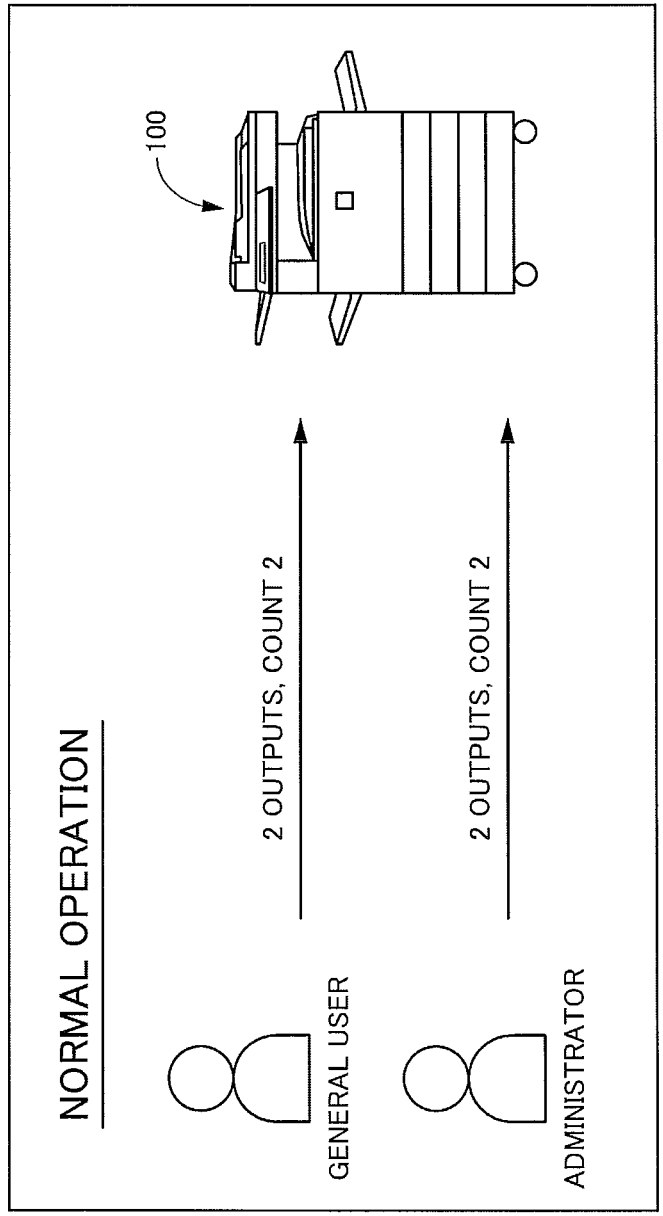

IMAGE FORMING APPARATUS REALIZING ELECTRICITY CONSERVATION BY REDUCING POWER CONSUMPTION

CROSS-REFERENCE TO RELATED APPLICATIONS

This nonprovisional application claims priority under 35 U.S.C. §119(a) on Patent Application No. 2011-235874 filed in Japan on Oct. 27, 2011, the entire contents of which are hereby incorporated by reference.

BACKGROUND OF THE INVENTION

1. Field of the Invention

The present invention relates to an image forming apparatus connectable to a network.

2. Description of the Background Art

A portable, handy image forming apparatus has been known as an image forming apparatus enabling on-site printing of image data saved in a portable terminal such as a note type PC, a digital still camera and the like. Japanese Patent Laying-Open No. 2002-205421 (hereinafter referred to as '421 Reference) discloses such a portable image forming apparatus (print control device). A portable image forming apparatus generally uses a battery as a power source. Therefore, such an apparatus has a problem that if the power supplied from the power source runs short during printing, printing abruptly stops. In order to avoid such a trouble, the print control device of '421 Reference skips printing of a color material layer and an overcoat layer, if it is determined that remaining amount of power is low during printing.

Recently, as one type of information processing apparatuses, an image forming apparatus (typically a copy machine) has been introduced to many places of business (companies and offices). In such a place of business, it is becoming a common practice to have an image forming apparatus having a printer function or copy function connected to a network and to share the apparatus by a plurality of users. Further, image forming apparatuses having a plurality of operational modes including a copy mode, an image communication mode (typically a facsimile mode), a network compatible printer mode and a scanner mode, such as an MFP (Multi-Function Peripheral), are increasing in number.

Different from the portable image forming apparatus or a portable terminal such as a note type PC provided with a battery, the image forming apparatus of this type is fed by mains power and, hence, free from low battery problems. In Japan, mains power supply has been very stable, except for very few accidental outages. Therefore, it has been a matter-of-course that power is always supplied stably to an image forming apparatus, and it has been unnecessary to consider any special measure to cope with low battery, or to prepare for expected power outage time.

Considering electricity supply situations of late, however, the stable power supply that has been long taken for granted (guaranteed) may no longer be realistic. Interruption of power supply or sudden blackout could occur at any time. Therefore, there has been a demand for managing and controlling image forming apparatuses with limited power supply. As a method for reducing power consumption, the energy-saving technique of '421 Reference may be applied to an image forming apparatus such as the MFP.

According to the technique of '421 Reference, however, though the power consumed for one printing operation can be saved as part of the printing process is omitted, the effect of saving power consumption is relatively small when the number of printing increases. Particularly when the image forming apparatus is shared by a plurality of users, many jobs may be handled at one time and, hence, if many jobs are executed at a time zone when electricity use peaks, the maximum power consumption would be so high as to cause power shortage. The technique described in '421 Reference cannot avoid such a situation.

SUMMARY OF THE INVENTION

In view of the foregoing, it is desirable to provide an image forming apparatus realizing electricity conservation by reducing power consumption, by discouraging use in the time zone of peak power consumption.

In order to attain the above-described object, according to an aspect, the present invention provides an image forming apparatus, including: a communication device configured to communicate with an external device through a network; an information obtaining unit configured to obtain information related to a state of power supply from the external device through the communication device; an image forming unit configured to form an image on a sheet of recording paper; an output number management unit configured to count the number of output sheets of recording paper on which images are formed by the image forming unit and to manage the number of output sheets; and a counting method switching device configured to switch a method of counting the number of outputs by the output number management unit, based on the information related to the state of power supply obtained by the information obtaining unit.

From the information related to the state of power supply obtained from the external device, whether or not it is a time zone of peak power use can be known. In the time zone when the power use peaks, it is desirable to curb the number of jobs. In an environment in which the number of outputs is managed, by switching the method of counting the number of outputs in accordance with the obtained information related to the power supply situation as described above, it is possible to discourage (reduce) execution of jobs (use by the users) in the time zone when the power use peaks. As a result, energy conservation (energy-saving) can be realized in such a time zone by reducing power consumption.

On the other hand, it is possible for the user to execute a larger number of jobs within his/her authority if he/she executes jobs in off-peak time zones.

In this manner, a scheme can be established that discourages (reduces) execution of jobs as much as possible in the time zone of peak power use and, therefore, peak power consumption can be reduced. This contributes to prevention of abrupt blackout or planned interruption of power supply.

Preferably, the counting method switching device includes: a determining unit configured to determine whether power shortage is expected, based on the information obtained by the information obtaining unit; and a switching device configured to maintain, if it is determined by the determining device that power shortage is not expected, a normal counting method used when power supply is sufficient as the method of counting the number of outputs, and if it is determined by the determining device that power shortage is expected, to switch the method of counting the number of outputs to a method of counting with a weight added to the counting method used when the power supply is sufficient.

The counting method switching device may include: a determining unit configured to determine whether current time is in a power restriction time zone requiring enforcement of power restriction; and a switching device configured to maintain, if it is determined by the determining device that the current time is not in the power restriction time zone, a normal counting method used when power supply is sufficient as the method of counting the number of outputs, and if it is determined by the determining device that the current time is in the power restriction time zone, to switch the method of counting the number of outputs to a method of counting with a weight added to the counting method used when the power supply is sufficient.

The counting method switching device may include: a determining unit configured to determine whether a power restriction time zone requiring enforcement of power restriction has started; and a switching device configured to maintain, if it is determined by the determining device that the power restriction time zone has not yet started, a normal counting method used when power supply is sufficient as the method of counting the number of outputs, and if it is determined by the determining device that the power restriction time zone has started, to switch the method of counting the number of outputs to a method of counting with a weight added to the counting method used when the power supply is sufficient. The determining device may include a determining unit configured to determine whether or not the time zone has been started when a job is to be started.

Here, preferably, the determining device further includes a device configured to determine whether or not the power restriction time zone is entered during execution of a job, based on the information obtained by the information obtaining unit; and the switching device includes a switching unit configured to switch the counting method such that if it is determined that the power restriction time zone is not entered during execution of a job, the method of counting the number of outputs is set to the normal counting method used when the power supply is sufficient, and if it is determined that the power restriction time zone is entered during execution of a job, the method of counting the number of outputs is set to the method of counting with weight added to the counting method when the power supply is sufficient. Thus, it becomes possible to discourage use when it is likely to enter the power restriction time zone during execution of a job. This also realizes power conservation (energy-saving) by reducing power consumption.

The determining device may further include a device configured to determine whether or not a power restriction time zone is entered during execution of a job, based on the information obtained by the information obtaining unit; and the image forming apparatus may further include: an execution interrupting device for interrupting execution of a job if it is determined that the power restriction time zone is entered during execution of the job; a counting method switching confirmation device configured to confirm the user, if execution of the job is interrupted by the execution interrupting device, whether the method of counting the number of outputs is to be set to the normal counting method used when the power supply is sufficient or to the counting method adding a weight to the counting method used when the power supply is sufficient; and an execution resuming device configured to resume execution of the job, after the confirmation by the user through the counting method switching confirmation device.

More preferably, the determining device may further determine whether or not the power restriction time zone has ended during execution of a job; and the image forming apparatus may further include a switching unit configured to have the method of counting with weight added as the method of counting the number of outputs if it is determined by the determining device that the power restriction time zone has not yet ended during execution of the job, and to switch the method of counting the number of outputs to the method of counting to the normal counting method used when the power supply is sufficient, if it is determined that the power restriction time zone ended during execution of the job.

More preferably, the output number managing unit counts the number of outputs user by user and regulates the numbers of outputs. Thus, execution of jobs (use by the users) in the time zone of peak power use can more effectively be reduced.

As described above, by the present invention, an image forming apparatus realizing electricity conservation by reducing power consumption, by discouraging use in the time zone when power consumption peaks can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 illustrates the manner of counting when the weighted counting method is set.

FIG. 14 illustrates the manner of counting when the normal counting method is set.

DESCRIPTION OF THE PREFERRED EMBODIMENTS

Figure 1:
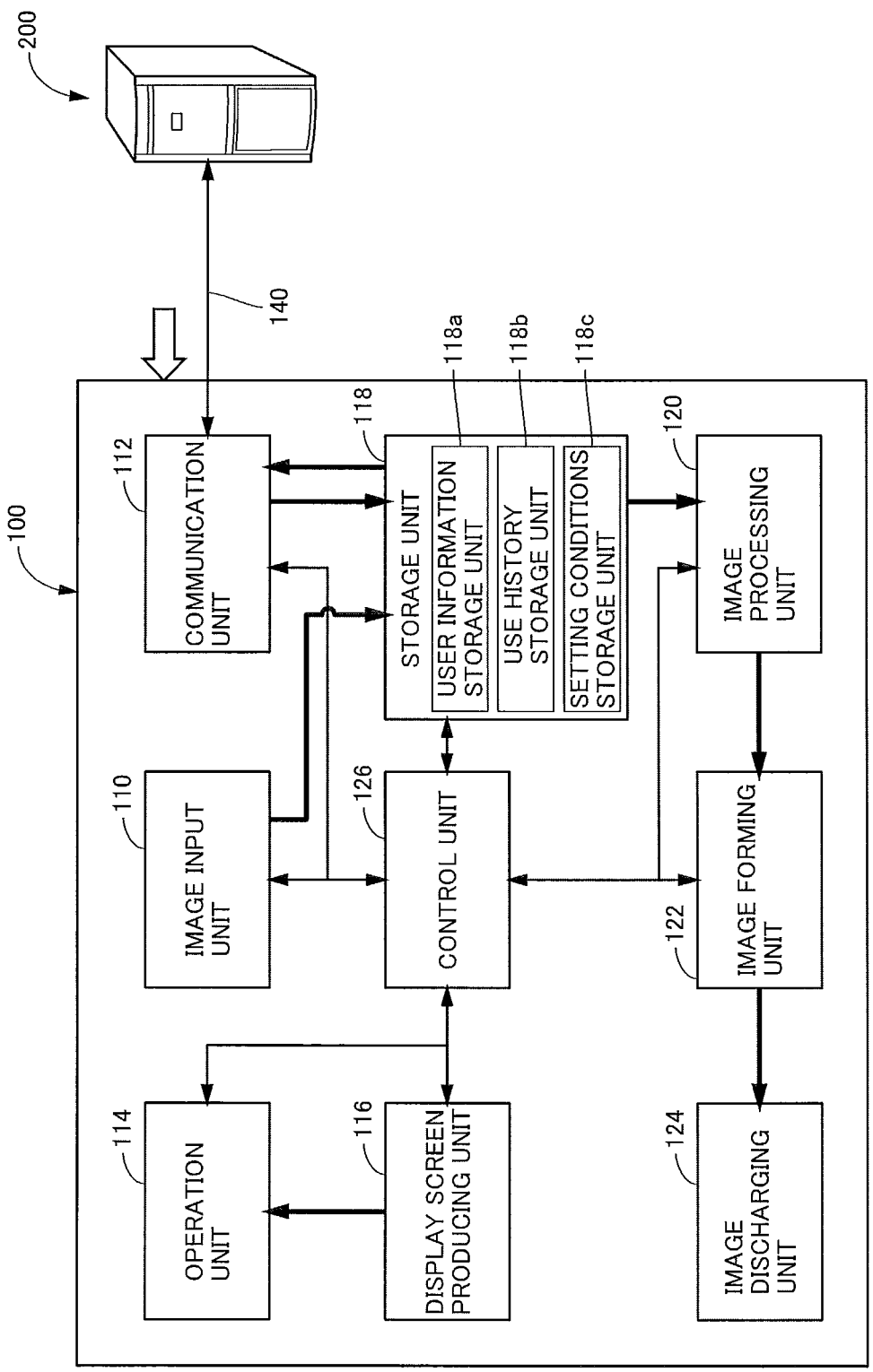
FIG. 1 shows an overall configuration of a network system formed including the image forming apparatus in accordance with an embodiment of the present invention.

In the following description, the same components are denoted by the same reference characters. Their functions and names are also the same. Therefore, detailed description thereof will not be repeated.

[Overall System Configuration]

Referring to FIG. 1, overall system configuration of the network system in accordance with an embodiment of the present invention will be described. The network system includes an image forming apparatus 100 implemented as an MFP, and a server computer 200 holding information related to the state of power supply and transmitting, in response to a request from the image forming apparatus 100, the information related to the state of power supply at the time of request to image forming apparatus 100. Image forming apparatus 100 and server computer 200 are connected to be communicable with each other by a network line 140.

Image forming apparatus 100 in accordance with the present embodiment has a function of counting the number of outputs user by user and managing the number of outputs. Image forming apparatus 100 obtains the information related to the state of power supply from server computer 200, and based on the obtained information, switches the method of counting the output numbers.

[Hardware Configuration]

<Image Forming Apparatus 100>

Referring to FIG. 1, image forming apparatus 100 forming the network system includes: an image input unit 110 for inputting image data; a communication unit 112 connected to a network line 140 for communication with server computer 200 through network line 140; a touch-panel type operation unit 114 including a display unit and an operation panel, used by the user for operating image forming apparatus 100; a screen producing unit 116 for producing a screen to be displayed on operation unit 114; and a storage unit 118 for storing various pieces of information including the information obtained through communication unit 112 and image data input through image input unit 110.

Image forming apparatus 100 further includes: an image processing unit 120 for performing various image processing operations on the input image data; an image forming unit 122 for printing an image represented by the image data on a sheet of recording paper; an image discharging unit 124 for discharging the printed sheet of recording paper; and a control unit 126 connected to image input unit 110, communication unit 112, operation unit 114, screen producing unit 116, storage unit 118, image processing unit 120 and image forming unit 122, for realizing general functions of the image forming apparatus.

Image input unit 110 includes a document reading unit reading a document image and outputting RGB (R: Red, G: Green, B: Blue) analog image signals. Communication unit 112 obtains the information related to the state of power supply by communication with server computer 200 through network line 140.

Control unit 126 is for overall control of image forming apparatus 100, and realizes printing process, FAX transmission/reception process, scanning process, copy process and processes using applications, in image forming apparatus 100. These processes are executed by various components forming image forming apparatus 100, not shown in FIG. 1, under the control of control unit 126.

Image forming apparatus 100 further includes a user authentication unit (not shown) for authorizing a user. In the present embodiment, when image forming apparatus 100 is activated, a log-in screen is displayed on operation unit 114. On the log-in screen, the user enters a log-in name and a password, to log-in.

Storage unit 118 includes a user information storage unit 118*a*, a use history storage unit 118*b*, and a setting conditions storage unit 118*c*. User information storage unit 118*a* stores the log-in names and passwords. The stored log-in names and passwords are associated with each other. When the log-in operation is done by a user, the user authentication unit determines whether or not to authorize the user, based on the data in user information storage unit 118*a*. Use history storage unit 118*b* stores user-by-user information related to use history.

Image forming apparatus 100 has a counter function of counting, user by user, the number of outputs sheets, and the counted numbers of outputs are managed. User information storage unit 118*a* mentioned above further stores the total number of outputs user by user. Setting conditions storage unit 118*c* stores various settings of image forming apparatus 100 set by an administrator. Various settings of image forming apparatus 100 by the administrator are made on a setting screen 300 (see FIG. 3) displayed when the administrator logs-in.

In image forming apparatus 100, various image processing operations are done on image data input through image input unit 110 at image processing unit 120, and the image data thus processed is output to image forming unit 122. Image forming apparatus 100 has a so-called laser type (electrophotography) printing function, in which laser beam is used for exposure. The apparatus, however, may have a different printing function.

Image forming unit 122 is for printing an image represented by the image data on a sheet of recording paper, and it includes, for example, a photoreceptor drum, a charger, a laser scan unit, a developer, a transfer device, a cleaning device, a fixing device, and an eraser device. A feeding path, for example, is provided in image forming unit 122 and a sheet of recording paper fed from a paper feed unit, not shown, is conveyed along the feeding path. The paper feed unit draws out sheets of recording paper held in a paper cassette or placed on a manual feed tray one by one and feeds to the feeding path of image forming unit 122.

While the sheet of recording paper is conveyed along the feeding path of image forming unit 122, the sheet passes between the photoreceptor drum and the transfer device, and further passes through the fixing device, whereby printing is done on the sheet of recording paper.

The photoreceptor drum rotates in one direction and its surface is cleaned by the cleaning device and the eraser device, and thereafter uniformly charged by the charger. The laser scan unit modulates a laser beam based on the image data as the object of printing, and repeatedly scans the surface of photoreceptor drum with the laser beam in a main scanning direction, to form an electrostatic latent image on the surface of photoreceptor drum. The developer supplies toner to the surface of photoreceptor drum to develop the electrostatic latent image, and thereby forms a toner image on the surface of photoreceptor drum.

The transfer device transfers the toner image on the surface of photoreceptor drum to the sheet of recording paper that is passing between the transfer device and the photoreceptor drum. The fixing device includes a heating roller for heating the sheet of recording paper and a pressure roller for pressing the sheet of recording paper. The sheet of recording paper is heated by the heating roller and pressed by the pressure roller, so that the toner image that has been transferred to the sheet of recording paper is fixed on the sheet. The sheet of recording paper discharged from the fixing device (printed sheet) is discharged through image discharging unit 124.

In the present embodiment, image forming apparatus 100 switches the method of counting the number of outputs based on the information related to the state of power supply obtained from server computer 200. Specifically, based on the information related to the state of power supply, control unit 126 determines whether the current time is in a time zone in which use of electric power peaks (the time zone in which restriction of power use is necessary). If it is determined to be in the time zone of peak power use, the method of counting the number of outputs is switched to a method of counting with weight, from the method (normal counting method) used when the power supply is sufficient.

Figure 3:
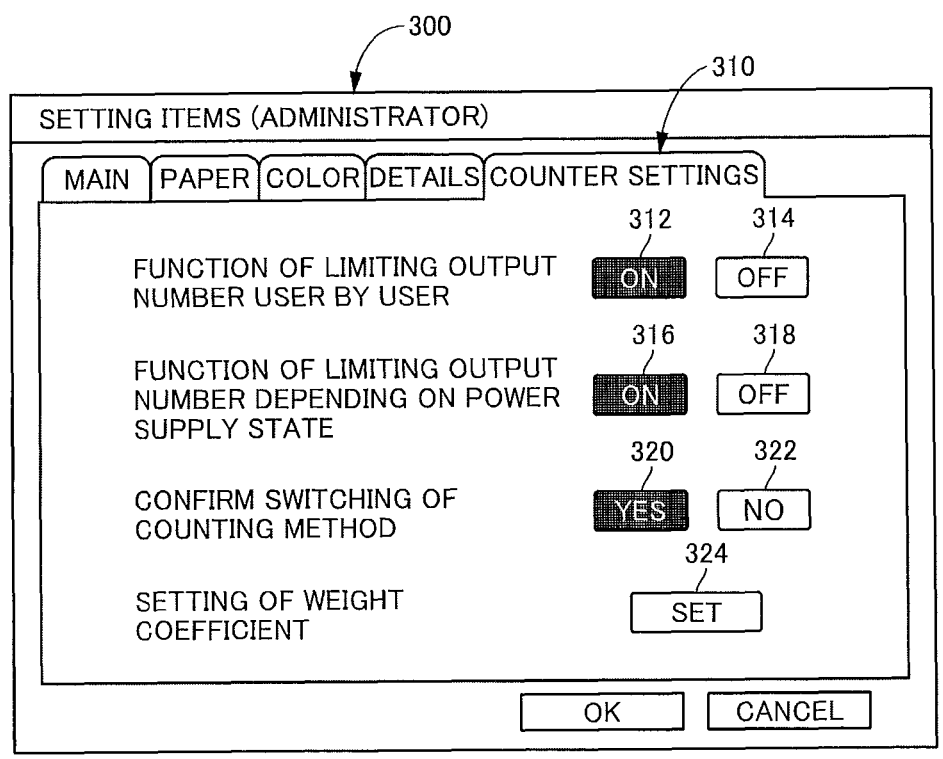
FIG. 3 shows an example of screen image (example of setting screen for an administrator) displayed on an operation unit of the image forming apparatus in accordance with an embodiment.

Such setting of counter is set by the administrator using the setting screen 300 for the administrator. Referring to FIG. 3, on setting screen 300 for the administrator, a counter setting tab 310 is provided for setting the counter. On counter setting tab 310, setting items including "FUNCTION OF LIMITING OUTPUT NUMBER USER BY USER," "FUNCTION OF LIMITING OUTPUT NUMBER DEPENDING ON POWER SUPPLY STATE," "CONFIRM SWITCHING OF COUNTING METHOD" and "SETTING OF WEIGHT COEFFICIENT" are displayed.

Further, on counter setting tab 310, "ON" key 312 and "OFF" key 314 for activating or deactivating the "FUNCTION OF LIMITING OUTPUT NUMBER USER BY USER," "ON" key 316 and "OFF" key 318 for activating or deactivating the "FUNCTION OF LIMITING OUTPUT NUMBER DEPENDING ON POWER SUPPLY STATE," and "YES" key 320 and "NO" key 322 to set or not to set the "CONFIRM SWITCHING OF COUNTING METHOD" as well as a "SET" key 324 to display another window to allow "SETTING OF WEIGHT COEFFICIENT" are provided.

The "FUNCTION OF LIMITING OUTPUT NUMBER USER BY USER" is a function of managing the user-by-user authorization and the number of outputs, for inhibiting or limiting the number of copies of color job, for inhibiting a print job while permitting a transmission job and so on, user by user. If "ON" key 312 is pressed, the "FUNCTION OF LIMITING OUTPUT NUMBER USER BY USER" is activated. If "OFF" key 314 is pressed, the "FUNCTION OF LIMITING OUTPUT NUMBER USER BY USER" is deactivated. If the "FUNCTION OF LIMITING OUTPUT NUMBER USER BY USER" is deactivated (off), the number of outputs (number of use) is not managed, and the number of outputs is not counted. Only one of the "ON" key 312 and "OFF" key 314 can be selected at one time.

"ON" key 316 and "OFF" key 318 for activating or deactivating the "FUNCTION OF LIMITING OUTPUT NUMBER DEPENDING ON POWER SUPPLY STATE" are usable only when the "FUNCTION OF LIMITING OUTPUT NUMBER USER BY USER" is activated, and either one of these can be selected. If "ON" key 316 is pressed, the "FUNCTION OF LIMITING OUTPUT NUMBER DEPENDING ON POWER SUPPLY STATE" is activated. When this function is active, the process for switching the method of counting the number of outputs based on the information related to the state of power supply obtained from server computer 200 is executed. If "OFF" key 318 is pressed, the "FUNCTION OF LIMITING OUTPUT NUMBER DEPENDING ON POWER SUPPLY STATE" is deactivated.

"YES" key 320 and "NO" key 322 to set or not to set the "CONFIRM SWITCHING OF COUNTING METHOD" are usable only when the "FUNCTION OF LIMITING OUTPUT NUMBER DEPENDING ON POWER SUPPLY STATE" is activated, and either one of these can be selected. If "YES" key 320 is pressed, the "CONFIRM SWITCHING OF COUNTING METHOD" is set. With this setting on, if the time zone of peak power use is entered while a job is being executed, a confirmation screen 600 (see FIG. 10) is displayed on operation unit 114, to ask the user whether the method of counting the number of outputs is to be switched to the method of counting with weight (hereinafter also referred to as "weighted counting method"). The user can determine by his/her own discretion whether or not the method of counting the number of outputs is to be switched to the weighted counting method. If "NO" key 322 is pressed, the "CONFIRM SWITCHING OF COUNTING METHOD" is not set.

Figure 4:
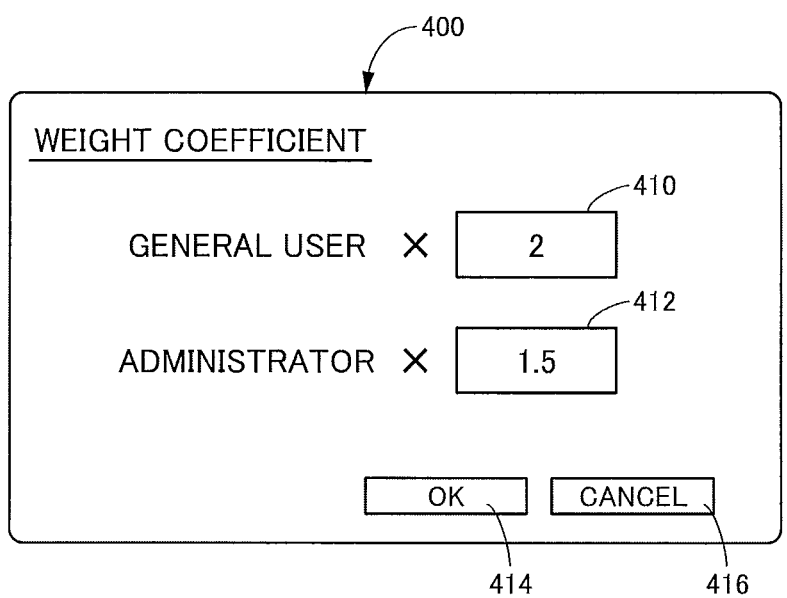
FIG. 4 shows an example of screen image (example of setting screen for setting a weight coefficient for an administrator) displayed on the operation unit of the image forming apparatus in accordance with an embodiment.

If "SET" key 324 is pressed, a weight coefficient setting screen 400 shown in FIG. 4 is displayed on operation unit 114. The administrator can set a weight coefficient appropriately, from this screen. Referring to FIG. 4, weight coefficient setting screen 400 includes a text field 410 for setting a weight coefficient for a general user, a text field 412 for setting a weight coefficient for the administrator, an "OK" key 414 and a "CANCEL" key 416. If "OK" key 414 is pressed, the weight coefficient or coefficients are set and the display of screen ends. If "CANCEL" key 416 is pressed, the set weight coefficient or coefficients are canceled and the display of screen ends. The weight coefficient for the general user may be the same as that for the administrator. FIG. 4 shows an example in which the weight coefficient for the general user is set higher than that of the administrator.

The setting conditions set by setting screen 300 for the administrator are stored in setting conditions storage unit 118c.

Figure 5:
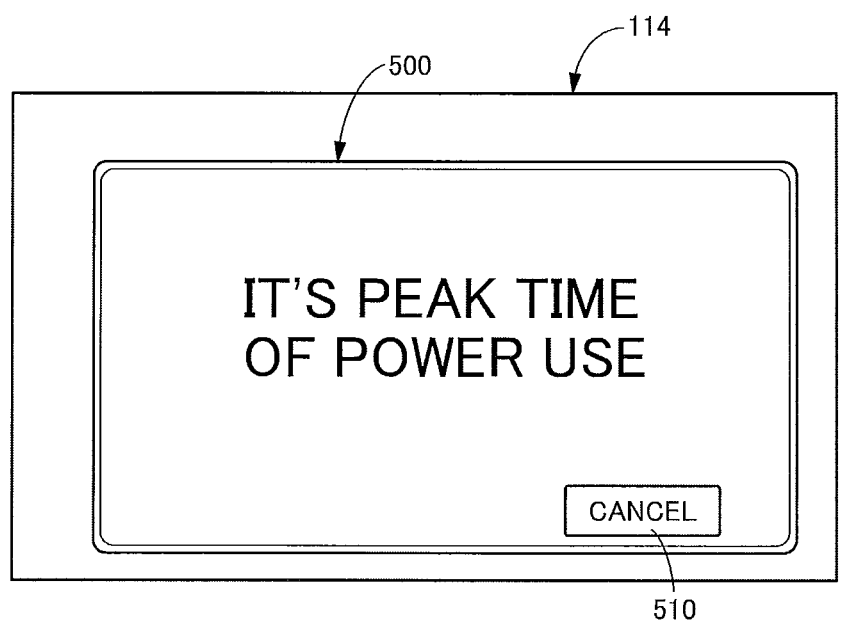
FIG. 5 shows an example of screen image (example of alarm display) displayed on the operation unit of the image forming apparatus in accordance with an embodiment.

Image forming apparatus 100 communicates with server computer 200 periodically (for example, at a time interval of 1 to 5 minutes), to obtain the information related to the state of power supply from server computer 200. From the obtained information, if the current time is in the time zone of peak power use, in order to notify the user of this fact, image forming apparatus 100 provides an alarm display 500 shown in FIG. 5 as a pop-up display on operation unit 114. Referring to FIG. 5, on alarm display 500, an alarm message "IT'S PEAK TIME OF POWER USE" and a "CANCEL" key 510 to end the display of alarm display 500 are displayed.

<Server Computer 200>

Figure 2:
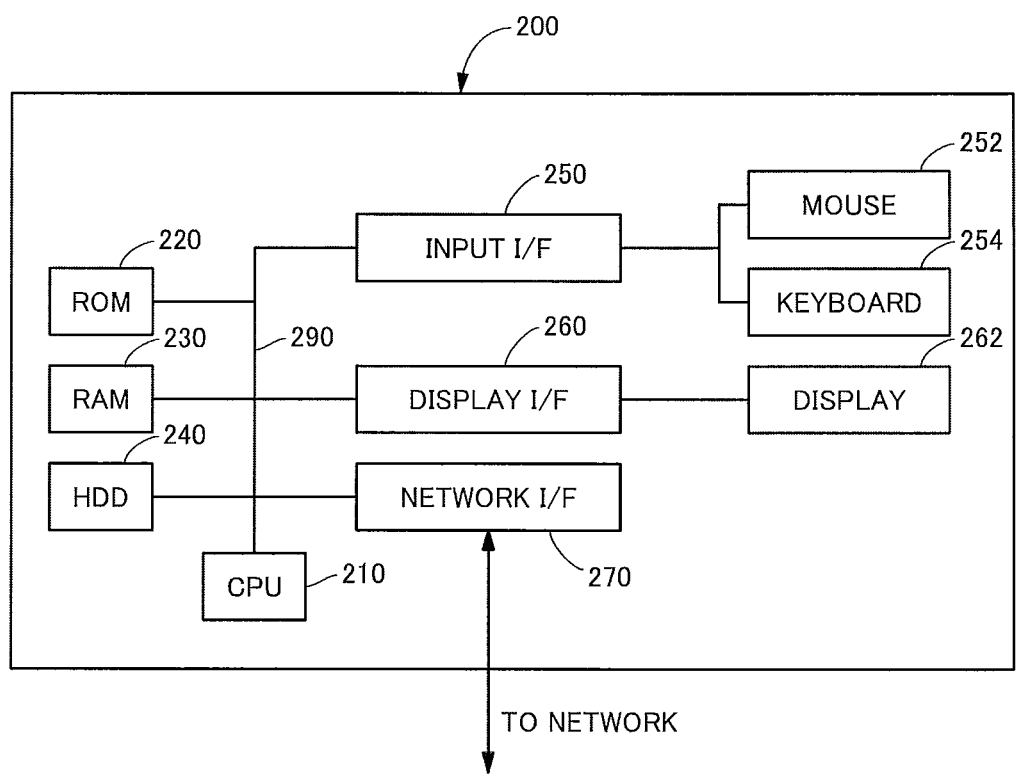
FIG. 2 is a control block diagram showing hardware configuration of a server computer shown in FIG. 1.

Referring to FIG. 2, server computer 200 communicating with image forming apparatus 100 in accordance with the present embodiment includes: a bus 290; a CPU 210 connected to bus 290; an ROM 220 connected to bus 290; an RAM 230 connected to bus 290; an HDD 240 connected to bus 290; an input I/F 250 connected to bus 290 for providing an interface for connection with a mouse 252 and a keyboard 254; a display I/F 260 connected to bus 290 for providing an interface for connection with a display 262; and a network I/F 270 providing a wired or wireless (in the present embodiment, wired) connection to network line 140.

Hard disk 240 stores the information related to the state of power supply, in addition to various data. The information is updated at a prescribed, relatively short time interval, to indicate the current state of power supply. In response to an inquiry from image forming apparatus 100, server computer 200 transmits latest information related to the state of power supply to image forming apparatus 100.

Bus 290, ROM 220, RAM 230, hard disk 240, input I/F 250, display I/F 260 and network I/F 270 all operate in cooperation under the control of CPU 210, whereby server computer 200 as the server computer in accordance with the present embodiment realizes processes of various applications.

[Software Configuration]

Image forming apparatus 100 in accordance with the present embodiment executes the process for switching the method of counting number of outputs based on the information related to the state of power supply obtained from server computer 200. Such a process is realized by software executed by the hardware configuration described above. In the following, the software configuration (control structure of a computer program) will be described, taking a document copying operation as an example.

Figure 6:
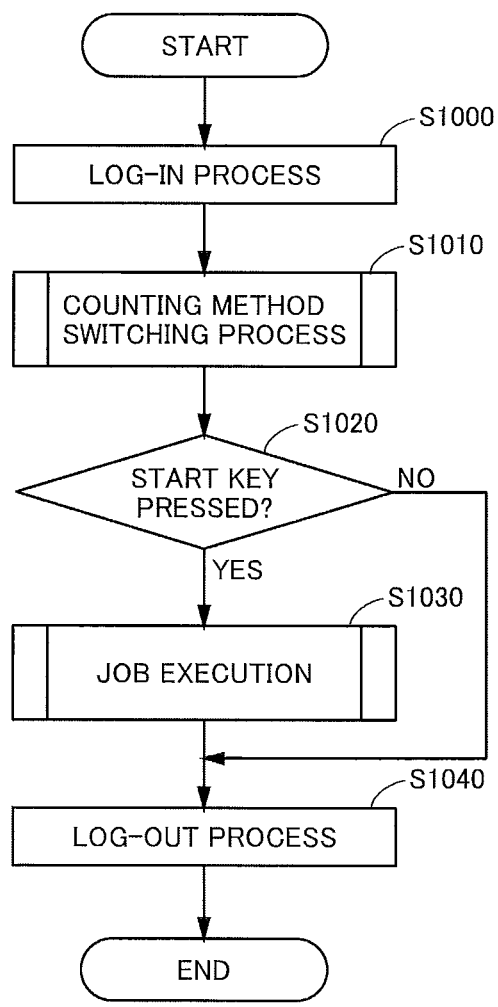
FIG. 6 is a flowchart representing a control structure of a program executed by the image forming apparatus shown in FIG. 1.

Referring to FIG. 6, the program includes: a step S1000 of executing the log-in process; a step S1010, following step S1000, of executing the process for switching the counting method; a step S1020, following step S1010, of determining whether or not a start key to start copying is pressed, and branching the control flow depending on the result of determination; a step S1030, executed if the start key is determined to be pressed at step S1020, of executing a job; and a step S1040 executed if the start key is not pressed and execution of a job is canceled at step S1020, or executed after step S1030, of executing a log-out process.

Figure 7:
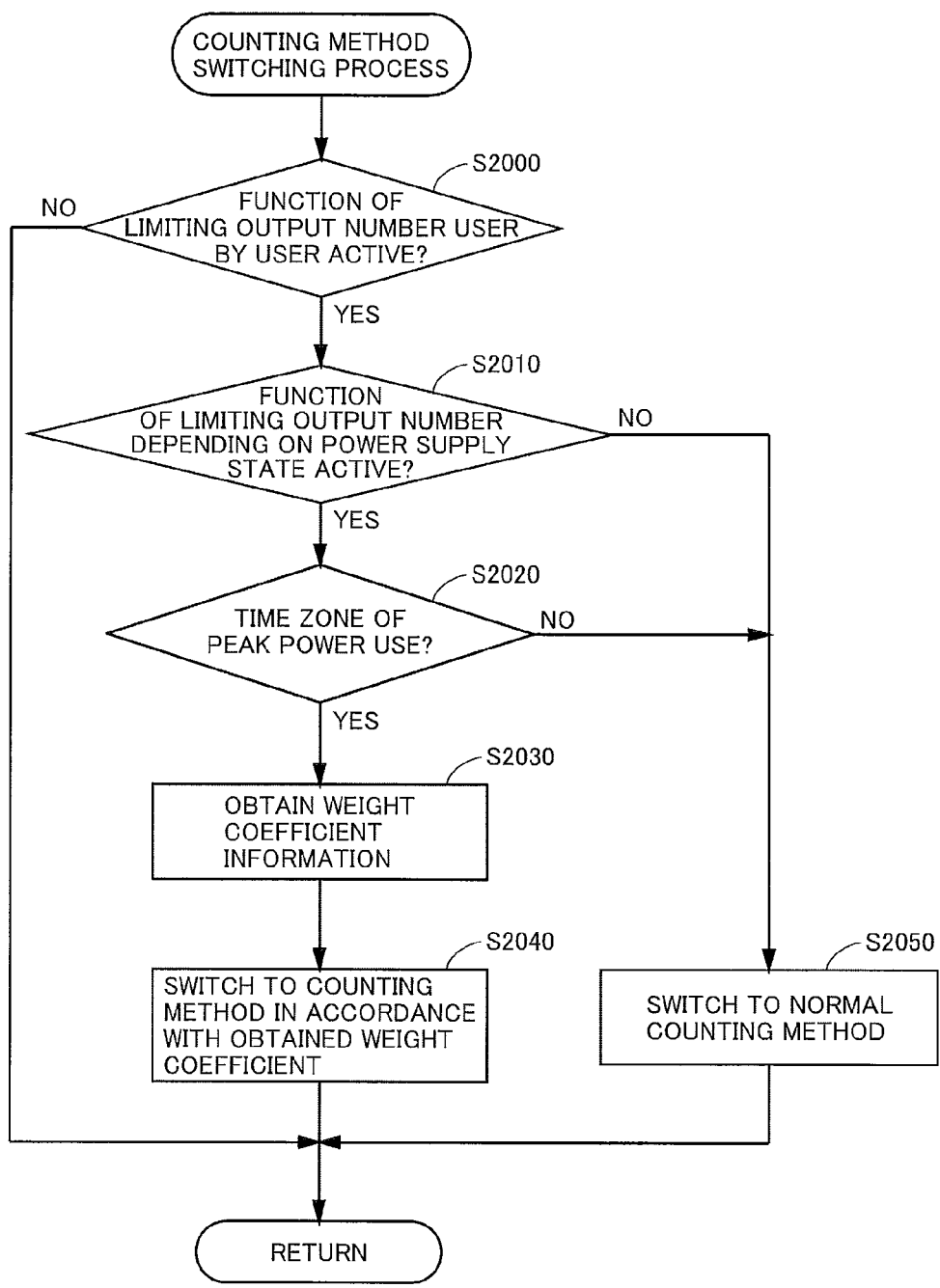
FIG. 7 is a detailed flow of step S1010 of FIG. 6.

FIG. 7 is a detailed flow of step S1010 shown in FIG. 6. Referring to FIG. 7, the routine includes: a step S2000 of determining whether or not the function of limiting output number user by user is active, and branching the control flow depending on the result of determination; a step S2010 executed if it is determined at step S2000 that the function of limiting output number user by user is active, of determining whether or not the function of limiting output number depending on power supply state is active, and branching the control flow depending on the result of determination; and a step S2020, executed if it is determined at step S2010 that the function of limiting output number depending on power supply state is active, of determining, based on the information related to the state of power supply obtained from server computer 200, whether or not the current time is in the time zone of peak power use, and branching the control flow depending on the result of determination.

If the "FUNCTION OF LIMITING OUTPUT NUMBER USER BY USER" is set active on the setting screen 300 shown in FIG. 3, the function of limiting output number user by user is determined to be active at step S2000, and if the "FUNCTION OF LIMITING OUTPUT NUMBER USER BY USER" is set inactive on the setting screen 300, the function of limiting output number user by user is determined not to be active (inactive) at step S2000. If it is determined at step S200 that the function of limiting output number user by user is determined not to be active (inactive), this routine ends. Then, the user-by-user number of outputs (the number of use) is not managed, and the number of outputs is not counted.

If the "FUNCTION OF LIMITING OUTPUT NUMBER DEPENDING ON POWER SUPPLY STATE" is set active on the setting screen 300 shown in FIG. 3, the function of limiting output number depending on power supply state is determined to be active at step S2010, and if the "FUNCTION OF LIMITING OUTPUT NUMBER DEPENDING ON POWER SUPPLY STATE" is set inactive on the setting screen 300, the function of limiting output number depending on power supply state is determined not to be active (inactive) at step S2010.

Again referring to FIG. 7, the routine further includes: a step S2030, executed if it is determined at step S2020 that the current time is in the time zone of peak power use, of obtaining (reading), from setting conditions storage unit 118c, the weight coefficient information stored in setting conditions storage unit 118c; a step S2040 of switching the counting method in accordance with the obtained weight coefficient (weighted counting method) and ending the routine; and a step S2050, executed if it is determined at step S2010 that the function of limiting output number depending on power supply state is inactive, or if it is determined at step S2020 that the current time is not in the time zone of peak power use, of setting the normal counting method (the count up method used when the power supply is sufficient), and ending the routine.

Figure 8:
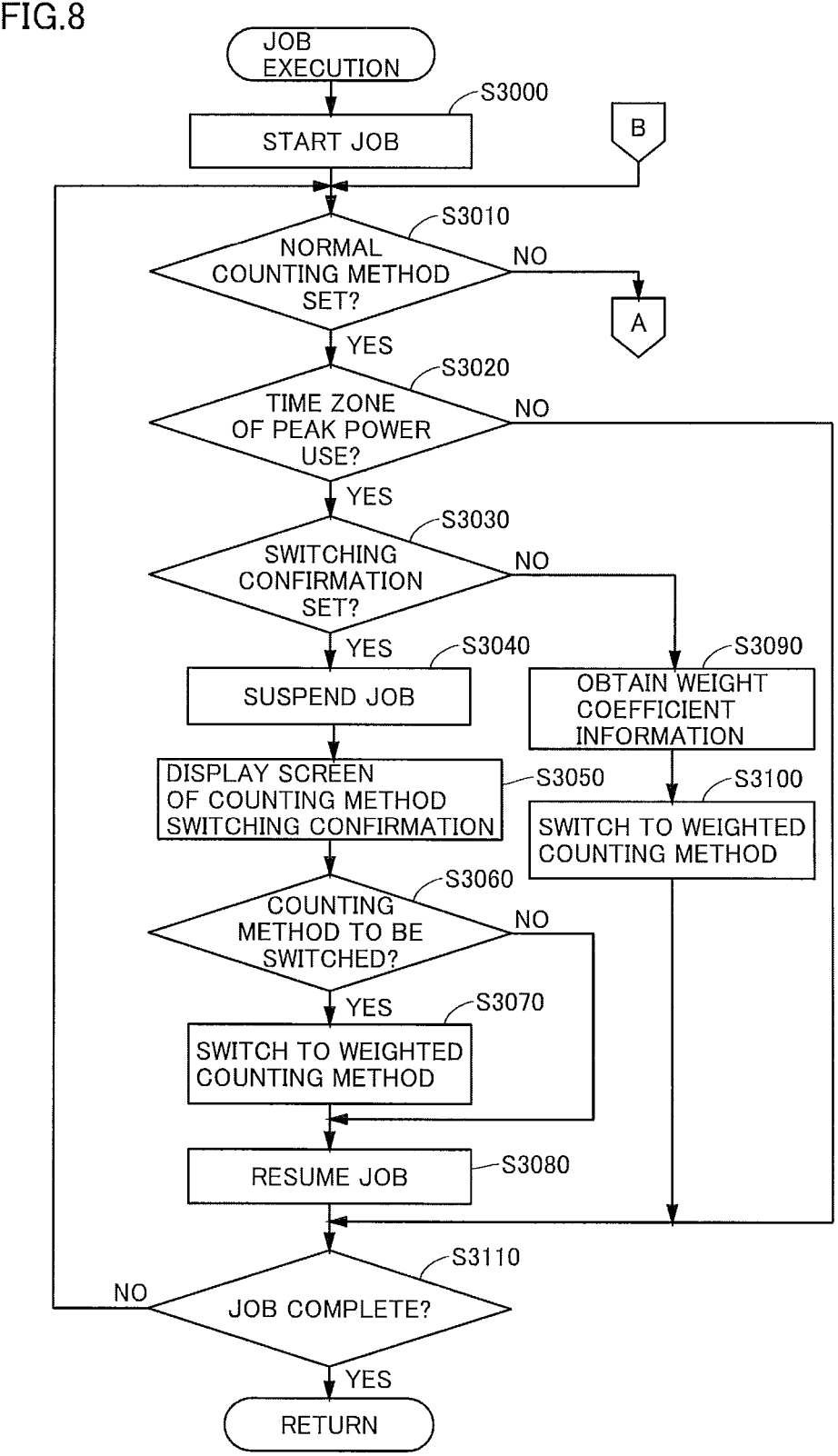
FIG. 8 is a detailed flow of step S1030 of FIG. 6.
Figure 9:
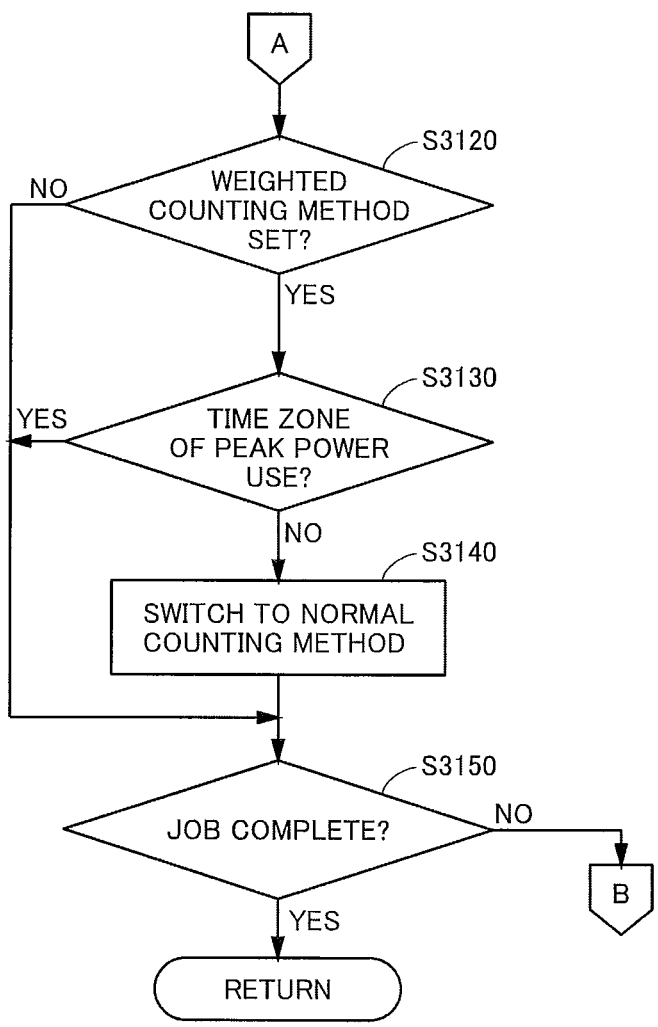
FIG. 9 is a detailed flow of step S1030 of FIG. 6.

FIGS. 8 and 9 are detailed flows of step S1030 shown in FIG. 6. Referring to FIGS. 8 and 9, the routine includes: a step S3000 of starting a job; a step S3010, following step S3000, of determining whether or not the function of limiting output number depending on power supply state is active and the counting method is set to the normal counting method, and branching the control flow depending on the result of determination; a step S3020, executed if it is determined at step S3010 that the function of limiting output number depending on power supply state is active and the counting method is set to the normal counting method, of determining whether or not the current time is in the time zone of peak power use, and branching the control flow depending on the result of determination; and a step S3030, executed if it is determined at step S3020 that the current time is in the time zone of peak power use, of determining whether or not the confirmation of switching of counting method is set to "YES", and branching the control flow depending on the result of determination.

If the determination at step S3010 is positive (YES), it means that before starting the job, it is not in the time zone of peak power user, and if the determination at step S3020 is positive (YES), it means that the time zone of peak power use started during execution of the job.

Further, on setting screen 300 shown in FIG. 3, if the confirmation of switching of counting method is set to "YES", the determination at step S3030 becomes positive (YES), and if confirmation of switching of counting method is set to "NO", the determination at step S3030 becomes negative. At S3010, if it is determined that the function of limiting output number depending on power supply state is active and the normal counting method is set, the number of outputs of the job that is being executed will be counted (counted up) in the normal counting method.

Figure 10:
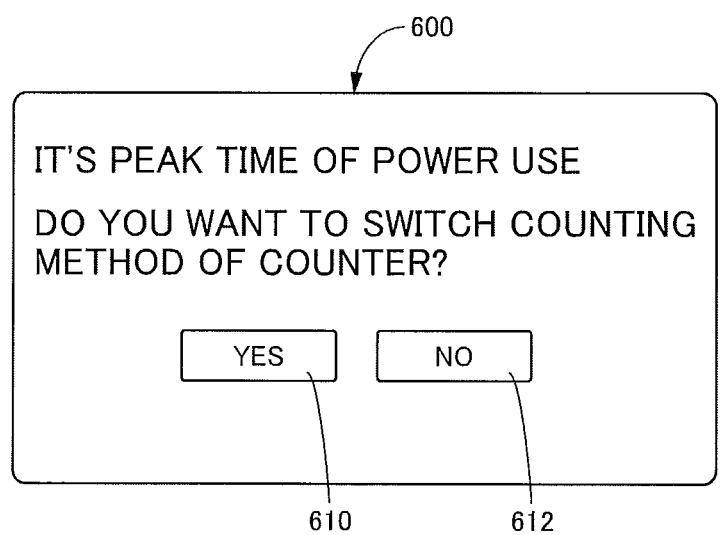
FIG. 10 shows an example of screen image (example of screen image for confirming switching of counting method) displayed on the operation unit of the image forming apparatus in accordance with an embodiment.

The routine further includes: a step S3030, executed if it is determined at step S3030 that the confirmation of switching of counting method is set to "YES", of temporarily suspending the job; a step S3050, following step S3040, of displaying a counting method switching confirmation screen 600 shown in FIG. 10 on operation unit 114; a step S3060, following step S3050, of determining whether or not an instruction is given to switch the counting method, and branching the control flow depending on the result of determination; a step S3070, executed if it is determined at step S3060 that the instruction to switch the counting method is given, to switch the counting method to the weighted counting method; and a step S3080, following step S3070, or executed if it is determined at step S3060 that the instruction to switch the counting method is not given, of resuming execution of the job.

Referring to FIG. 10, on switching confirmation screen 600, an alarm message "IT'S PEAK TIME OF POWER USE," is displayed and, in addition, an inquiry "Do you want to switch counting method of counter?" as well as "YES" key 610 for switching the method of counting the number of outputs to the weighted counting method and "NO" key 612 for not to switching are displayed. If "YES" key 610 is pressed by the user, at step S3060 shown in FIG. 8, it is determined that an instruction to switch the counting method is given, and at step S3070, the method is switched to the weighted counting method. On the other hand, if "NO" key 612 is pressed, at step S3060, it is determined that any instruction to switch is not given (an instruction not to switch is given), and the normal counting method is maintained.

Again referring to FIG. 8, if the job is resumed at step S3080 and the counting method has been switched to the weighted counting method, the number of outputs of the job that is being executed is counted with weight, than in the normal counting method. If the counting method is not switched and the normal counting method is used continuously, the number of outputs of the job that is being executed is counted as usual, in the normal counting method.

The routine further includes: a step S3090, executed if it is determined at step S3030 that the confirmation of switching of counting method is not set to "YES," of obtaining the weight coefficient information stored in setting conditions storage unit 118c; a step S3100, following step S3090, of switching to the counting method with the obtained weight (weighted counting method); and a step S3110 executed after step S3080 and S3100, or if it is determined at step S3020 that the current time is not in the time zone of peak power use, of determining whether or not the job is completed, and branching the control flow depending on the result of determination.

If it is determined at step S3020 that the current time is not in the time zone of peak power use, the number of outputs of the job that is being executed is counted in the normal counting method. On the other hand, if the counting method is switched at step S3100, the number of outputs of the job that is being executed is counted with weight added to the normal counting method. If it is determined at step S3110 that the job is completed, the routine ends, and if not, the control returns to step S3010.

Referring to FIGS. 8 and 9, the routine further includes: a step S3120, executed if it is determined at step S3010 that at least one of the conditions that the function of limiting output number depending on power supply state is active and that the counting method is set to the normal counting method is unsatisfied, of determining whether or not the counting method is set to the weighted counting method, and branching the control flow depending on the result of determination; a step S3130, executed if it is determined at step S3120 that the method is set to the weighted counting method, of determining whether the current time is in the time zone of peak power use, and branching the control flow depending on the result of determination; a step S3140, executed if it is determined at step S3130 that the current time is not in the time zone of peak power use, of switching the counting method to the normal counting method; and a step S3150, executed if it is determined at step S3120 that the counting method is not set to the weighted counting method, if it is determined at step S3130 that the current time is in the time zone of peak power use, or after step S3140, of determining whether or not the job is completed, and branching the control flow depending on the result of determination.

If the determination at step S3120 is negative (NO), it means that at step S2000 shown in FIG. 7, the function of limiting output number user by user is determined to be inactivated and the user-by-user number of outputs is not counted, or at step S2010 shown in FIG. 7, the function of limiting output number depending on power supply state is determined to be inactivated, and the counting method is set to the normal counting method. If the function of limiting output number user by user is set to be inactive, the number of outputs of the job that is being executed is not counted user by user, while if the function of limiting output number depending on power supply state is set to be inactive, the number of outputs of the job that is being executed is counted by the normal counting method. If the counting method is switched to the normal counting method at step S3140, the number of outputs of the job that is being executed is counted by the normal counting method. If it is determined at step S3150 that the job is completed, the routine ends, and if it is determined that the job is not yet completed, the control returns to step S3010 shown in FIG. 8.

Figure 11:
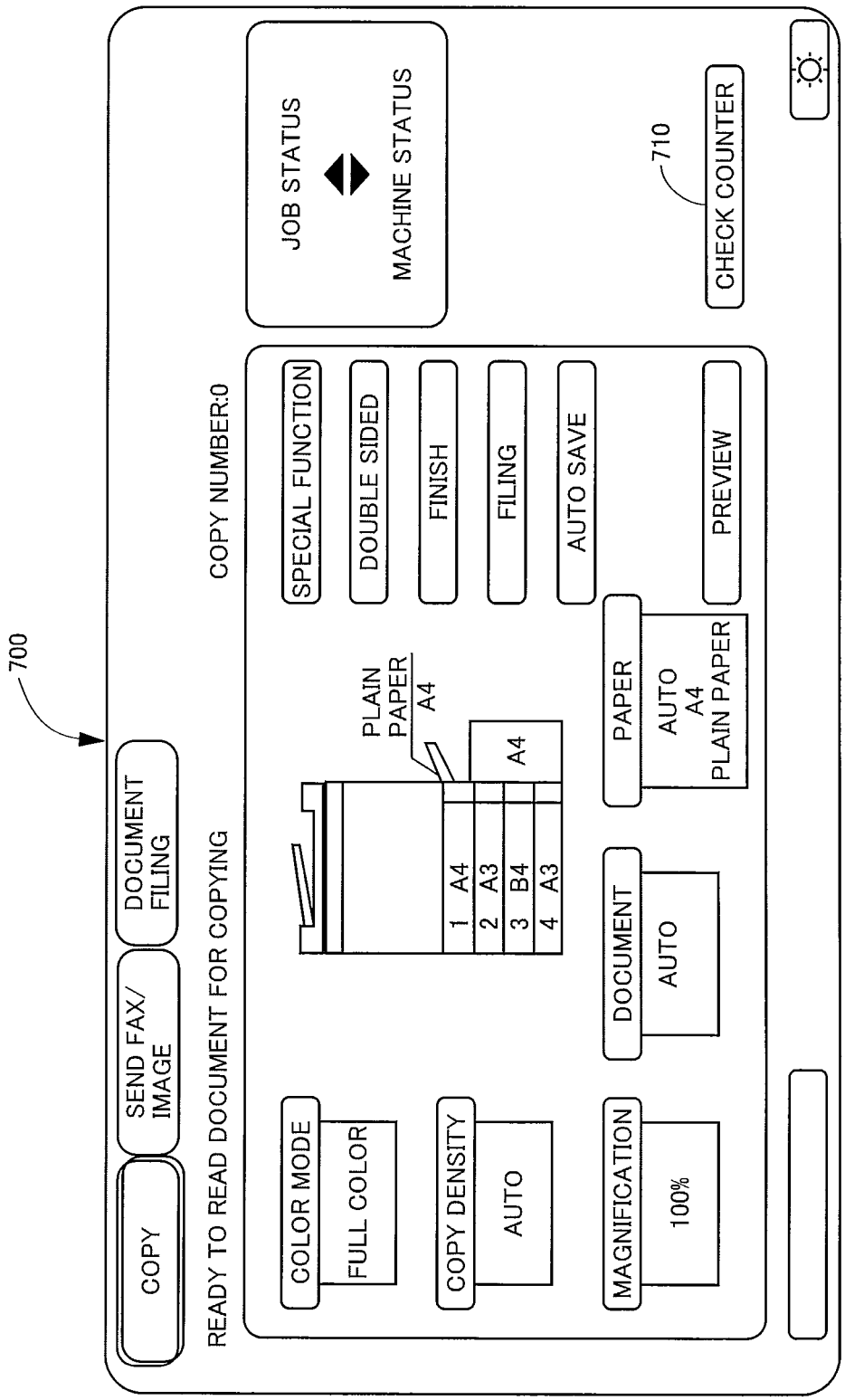
FIG. 11 shows an example of screen image (example of initial screen image) displayed on the operation unit of the image forming apparatus in accordance with an embodiment.
Figure 12:
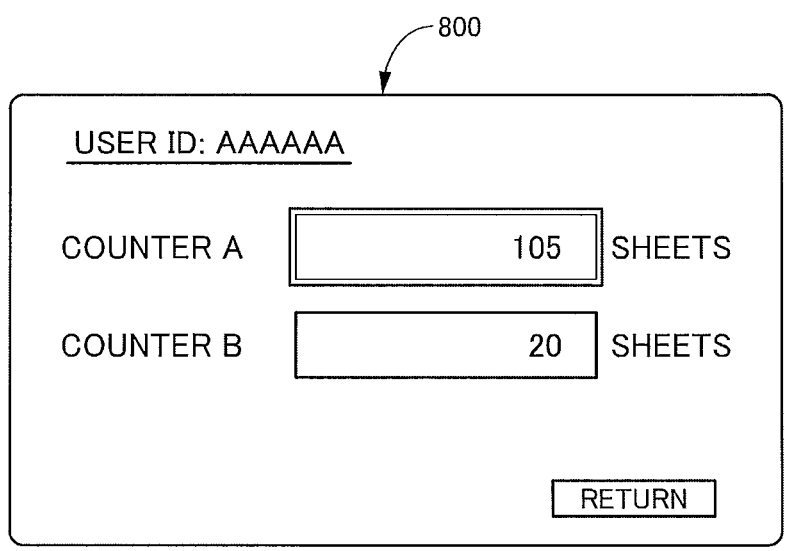
FIG. 12 shows an example of screen image (example of counter screen image) displayed on the operation unit of the image forming apparatus in accordance with an embodiment.

The total count of the output numbers of each user is displayed on operation unit 114. Referring to FIG. 11, on an initial screen displayed on operation unit 114, a "CHECK COUNTER" key 710 is provided, and when this key is pressed, a counter screen 800 shown in FIG. 12 is displayed on operation unit 114. Referring to FIG. 12, on counter screen 800, two counters, that is, counter A and counter B are displayed. Counter A indicates the number of outputs (total count) of the job or jobs executed in the normal time zone of power use (other than the peak time zone), and counter B indicates the number of outputs (total count) of the job or jobs executed in the time zone of peak power use. From these two counters, it can be seen how much jobs are executed in the time zone of peak power use.

[Operation]

An operation of image forming apparatus 100 in accordance with the present embodiment based on the configuration and flowcharts as above will be described with reference to FIGS. 1, 3 to 10, 13 and 14. In the following description, it is assumed that settings of image forming apparatus 100 have been done in advance by an administrator.

When image forming apparatus 100 is powered on, image forming apparatus 100 communicates with server computer 200. Image forming apparatus 100 periodically communicates with server computer 200, in order to constantly obtain latest information related to the state of power supply from server computer 200.

Control unit 126 of image forming apparatus 100 executes the log-in process. Here, control unit 126 determines whether or not the user who uses the image forming apparatus 100 has logged-in after making a log-in request. Control unit 126 causes operation unit 114 to display a user ID and password entering screen (not shown), and when the user ID and the password are entered, it determines that a user has requested log-in to use the image forming apparatus 100. If the input user ID and the password match the user ID and the password stored in user information storage unit 118a (see FIG. 1), control unit 126 permits log-in. When log-in is permitted by control unit 126, the input user ID is stored as currently logged-in user, in storage unit 118.

Image forming apparatus 100 reads settings stored in setting conditions storage unit 118c and thereby determines whether or not the function of limiting output number user by user is active (step S2000 of FIG. 7). If it is active (YES at step S2000), whether or not the function of limiting output number depending on power supply state is active is determined (step S2010 of FIG. 7). If the function of limiting output number depending on power supply state is active (YES at step S2010), whether or not the current time is in the time zone of peak power use is determined, based on the information related to the state of power supply obtained from server computer 200 (step S2020 of FIG. 7).

If the current time is in the time zone of peak power use (YES at step S2020), alarm screen 500 is displayed on operation unit 114 as shown in FIG. 5 to notify the user that it is the time zone of peak power use. In addition, the method of counting the number of outputs is switched to the weighted counting method.

The user is aware that if a job is executed in the time zone of peak power use, the number of outputs is counted to be larger than in the normal state (so informed by the administrator). Therefore, in an environment in which the number of outputs is regulated user by user, if a job is executed in this time zone, the number of jobs that can be executed by the user becomes smaller.

If the user cancels execution of the job (NO at step S1020 of FIG. 6), control unit 126 executes the log-out process (step S1040 of FIG. 6). Here, control unit 126 determines whether or not the user who ends use of the image forming apparatus 100 has requested a log-out. Control unit 126 causes operation unit 114 to display a log-out request button, and if this button is pressed, it determines that the user who used the image forming apparatus 100 has logged-out. When log-out is requested, the information stored as the currently logged-in user is deleted.

If the current time is already in the time zone of peak power use before the log-in process (step S1040 of FIG. 6), alarm screen 500 shown in FIG. 5 appears on operation unit 114 and, therefore, the user knows that it is the time zone of peak power use. Thus, it discourages the user to execute a job.

On the other hand, if the user executes a job knowing that the current time is in the time zone of peak power use, the number of outputs is counted with weight, than in usual time.

Referring to FIG. 13, when the counting method is set to the weighted counting method as it is in the time zone of peak power use, image forming apparatus 100 counts the number of outputs of the job that is being executed with weight, than in the normal counting method. Assume, for example, that the weight coefficient for a general user is set to "2", and the weight coefficient for an administrator is set to "1.5", as shown in FIG. 4. If a general user outputs two copies, the count will be 4 (=2×2). If an administrator outputs two copies, the count will be 3 (=2×1.5).

As described above, if a job is executed in the time zone of peak power use, image forming apparatus 100 counts the number of outputs with weight. It is possible, however, that the time zone of peak power use ends during execution of a job (NO at step S3130 of FIG. 9). In such a case, the counting method is switched to the normal counting method (step S3140 of FIG. 9), and the number of outputs is counted by the normal counting method.

On the other hand, if the current time is out of the time zone of peak power use, the counting method is not switched, and the number of outputs is counted by the normal counting method.

Referring to FIG. 14, if the counting method is set to the normal counting method, the number of outputs of the job that is being executed is counted in the normal manner. By way of example, if a general user outputs two copies, the count will be 2, and if an administrator outputs two copies, the count will be 2.

It is also possible that though a job is started before the time zone of peak power use, the peak time zone is entered during execution of the job (YES at step S3020 of FIG. 8). In that case, whether or not the confirmation of switching of counting method is set to "YES" is determined (step S3030 of FIG. 8), and if it is set to "YES" (YES at step S3030), image forming apparatus 100 suspends the job that is being executed (step S3040 of FIG. 8). Then, counting method switching confirmation screen 600 shown in FIG. 10 is displayed on operation unit 114. In accordance with an operation of confirmation screen 600 by the user, image forming apparatus 100 determines whether or not the counting method is to be switched. If the user presses "YES" key 610, the counting method is switched to the weighted counting method, and if the user presses "NO" key 612, the counting method is not switched and the normal counting method is used continuously.

If the switching of counting method is done by the discretion of the user, it is likely that user presses "NO" key 612 to continue the job with the normal counting method. In such a case, the administrator may set to deactivate confirmation of switching of counting method, on setting screen 300 shown in FIG. 3.

If the time zone of peak power use started during execution of the job and the confirmation of switching of counting method is set to "NO" (NO at step S3030 of FIG. 8), image forming apparatus 100 switches the counting method to the weighted counting method (step S3100 of FIG. 8).

If the job ends (YES at step S3110 or step S3150), control unit 126 executes the log-out process (step S1040 of FIG. 6).

Effects of the Present Embodiment

As is apparent from the description above, use of image forming apparatus 100 in accordance with the present embodiment attains the following effects.

From the information related to the state of power supply obtained from server computer 200, whether or not it is in the time zone of peak power use can be known. In the time zone of peak power use, it is desired to avoid execution of jobs as much as possible. In image forming apparatus 100 in accordance with the present embodiment, in an environment in which the number of outputs is regulated, the method of counting the number of outputs is switched in accordance with the information related to the state of power supply, so as to discourage execution of jobs in the time zone of peak power use. As a result, energy conservation (energy-saving) can be realized by reducing power consumption in such a time zone.

On the other hand, the user can execute larger number of jobs in his/her authorized power by executing jobs in time zones when power use is off-peak.

In this manner, the configuration described above realizes a scheme that discourages (reduces) the jobs as much as possible in the time zone of peak power use. Thus, it contributes to reduce peak power consumption and to prevent abrupt blackout or planned interruption of power supply caused by power shortage.

Further, if the time zone of peak power use starts during execution of the job, the method of counting the number of outputs is switched to the weighted counting method and, therefore, it is possible to discourage the user to use the apparatus when it is likely that the time zone of peak power use starts during execution of the job. This also reduces power consumption and leads to energy conservation (energy-saving) by reducing power consumption.

Further, since the weight coefficient for general users larger in number is made higher (stricter) than that of administrators smaller in number, higher effect of reducing power consumption can be expected.

By the present embodiment, image forming apparatus 100 can be managed and controlled with limited power supply.

[Modification]

Though an example in which the present invention is applied to an MFP as one type of image forming apparatus has been described above, the present invention is not limited to such an embodiment. The image forming apparatus may not be an MFP. By way of example, it may be an image forming apparatus such as a copy machine or a printer.

To the network system including the image forming apparatus, a client computer issuing a print request to the image forming apparatus may be connected. When a print request is issued from a client computer to the image forming apparatus such as an MFP or a printer, the number of outputs can be regulated user by user as the user ID or the like is input through a user interface (UI) on the printer driver. In such an environment, the information related to the state of power supply may be displayed on a display of the client computer.

In the embodiment described above, a configuration has been described in which the counter screen is displayed on the operation unit of image forming apparatus, to allow confirmation of user-by-user number of outputs on the counter screen. The present invention, however, is not limited to such an embodiment. By way of example, the number of outputs may be checked using a WEB page, or by referring to a tally system through a network.

In the embodiment above, an example in which the method of counting is switched to the normal counting method if the time zone of peak power use ends during execution of a job has been described. The present invention, however, is not limited to such an embodiment. Even if the time zone of peak power use ends during execution of a job, the number of outputs may be counted by the weighted counting method, without switching to the normal counting method.

Further, though an example in which the number of outputs is counted user by user has been described in the embodiment above, the present invention is not limited to such an embodiment. By way of example, the number of outputs may be counted group by group.

Further, though an example of user authentication using a log-in screen has been described in the embodiment above, the present invention is not limited to such an embodiment. The user authentication for log-in may be done without using the log-in screen. By way of example, an authentication card having a user ID added in advance may be handed to each user, and the user authentication may be executed by having the authentication card read by a card reader attached to the image forming apparatus. By this method, it is possible for the user to log-in by simply passing the authentication card over the card reader.

Further, though an example in which the method of counting the number of outputs is switched in the time zone of peak power use (the time zone in which restriction of power consumption is necessary) has been described in the embodiment above, the present invention is not limited to such an embodiment. The method of counting may be switched, for example, in a state of higher emergency (a state in which shortage of power supply is imminent (when electricity consumption nearly reaches the upper limit)), rather than in the time zone of peak power use. Further, a configuration allowing setting of a plurality of different weight coefficients may be adopted. In that case, preferably, if the current time is in the time zone of peak power use, setting of a first weight coefficient is applied, and in a situation in which shortage of power supply is highly likely, setting of a second weight coefficient that is stricter (severer) than the first weight coefficient is applied, based on the information related to the state of power supply obtained from the server computer.

Further, in the embodiment above, determination as to whether the current time is in the time zone of peak power use based on the information related to the state of power supply may be made by, for example, the operation unit, other than the control unit.

In the embodiment above, if it is set not to display the counting method switching confirmation screen on the operation unit when the time zone of peak power consumption starts during execution of a job, a pop-up image or the like notifying the user that the time zone of peak power use started may be displayed on the operation unit, in place of the switching confirmation screen.

Further, in the embodiment above, the information related to the state of power supply obtained from the server computer may be any information that represents the state of power supply at the current time.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus, comprising:
a communication device configured to communicate with an external device through a network;
an information obtaining unit configured to obtain information related to a state of power supply from said external device through said communication device;
an image forming unit configured to form an image on a sheet of recording paper;
an output number management unit configured to count the number of output sheets of recording paper on which images are formed by said image forming unit and to manage the number of output sheets; and
a counting method switching device configured to switch a method of counting the number of outputs by said output number management unit, based on the information related to the state of power supply obtained by said information obtaining unit; wherein
said counting method switching device includes
a determining unit configured to determine whether current time is in a power restriction time zone requiring enforcement of power restriction, and
a switching device configured to maintain, if it is determined by said determining unit that the current time is not in said power restriction time zone, a normal counting method used when power supply is sufficient as the method of counting the number of outputs, and if it is determined by said determining unit that the current time is in said power restriction time zone, to switch the method of counting the number of outputs to a method of counting with a weight added to the counting method used when the power supply is sufficient.

2. An image forming apparatus, comprising:
a communication device configured to communicate with an external device through a network;
an information obtaining unit configured to obtain information related to a state of power supply from said external device through said communication device;
an image forming unit configured to form an image on a sheet of recording paper;
an output number management unit configured to count the number of output sheets of recording paper on which images are formed by said image forming unit and to manage the number of output sheets; and
a counting method switching device configured to switch a method of counting the number of outputs by said output number management unit, based on the information related to the state of power supply obtained by said information obtaining unit; wherein
said counting method switching device includes
a determining unit configured to determine whether a power restriction time zone requiring enforcement of power restriction has started, and
a switching device configured to maintain, if it is determined by said determining unit that said power restriction time zone has not yet started, a normal counting method used when power supply is sufficient as the method of counting the number of outputs, and if it is determined by said determining unit that said power restriction time zone has started, to switch the method of counting the number of outputs to a method of counting with a weight added to the counting method used when the power supply is sufficient; and
said determining unit includes a determining unit configured to determine whether or not said time zone has been started when a job is to be started.

* * * * *